United States Patent [19]

Moody

[11] Patent Number: 4,968,368
[45] Date of Patent: Nov. 6, 1990

[54] METHOD AND APPARATUS FOR LINING VESSELS

[75] Inventor: Dale R. Moody, Dana Point, Calif.

[73] Assignee: Steelastic West, Inc., Buena Park, Calif.

[21] Appl. No.: 392,483

[22] Filed: Aug. 11, 1989

[51] Int. Cl.$^5$ .............................. B29C 63/32
[52] U.S. Cl. ..................... 156/187; 118/215; 118/233; 118/239; 118/DIG. 10; 156/195; 156/244.13; 156/391; 156/428
[58] Field of Search ............... 118/55, 105, 106, 107, 118/214, 215, 233, 239, 254, 257, 306, 318, DIG. 10; 264/269, 270, 209.2, 310, 311, 312; 427/231; 493/294; 156/74, 184, 187, 195, 244.13, 391, 392, 425, 428, 543, 580

[56] References Cited

U.S. PATENT DOCUMENTS

| | | | |
|---|---|---|---|
| 1,871,917 | 8/1932 | Rocca | 118/233 |
| 2,133,013 | 10/1938 | Boylan et al. | 118/DIG. 10 |
| 2,133,015 | 10/1938 | Boylan et al. | 118/DIG. 10 |
| 2,193,899 | 3/1940 | Casto et al. | 264/311 |
| 2,598,972 | 6/1952 | Chappell | 264/269 |
| 3,126,306 | 3/1964 | Sherman | 156/187 |
| 3,303,079 | 2/1967 | Carter | 156/172 |
| 4,415,390 | 11/1983 | Smith | 156/392 |
| 4,596,619 | 6/1986 | Marks | 156/171 |

Primary Examiner—Michael W. Ball
Assistant Examiner—Steven D. Maki
Attorney, Agent, or Firm—Renner, Kenner, Greive, Bobak, Taylor & Weber

[57] ABSTRACT

A method and apparatus (10) for lining the interior surface (45) of a vessel (18) with a continuous ribbon (44) of lining material. The apparatus (10) has a cantilevered boom (21) with a guide assembly (25) secured to the unsupported end portion (24) of the boom (21). Mechanism (34-38) drives the conveyor belt (33)—from a location that is normally exterior to the vessel (18)—along the boom (21) and about a path defined by the guide assembly (25). The guide assembly (25) both turns and twists the conveyor belt (33). Turning the belt (33) causes it to encircle the boom (21), thereby extending the belt (33) radially to engage the interior surface (45) of the vessel (18). In addition, the guide assembly (25) twists the belt (33) so that the normally inner, supporting surface (46) thereon temporarily reverses positions with the normally outer, sliding surface (49). Hence, a ribbon (44) of lining material deposited on the supporting surface (46) will be brought into contact with the interior surface (45) of the vessel (18). The belt (33) thus delivers the ribbon (44) and applies it to the interior surface (45). Moreover, the engagement of the belt (33) with the interior surface (45) also rotates the vessel (18), and, if desired, may be employed to effect longitudinal translation of the vessel (18). Longitudinal translation of the vessel (18) may, however, be achieved by independent mechanism.

12 Claims, 3 Drawing Sheets

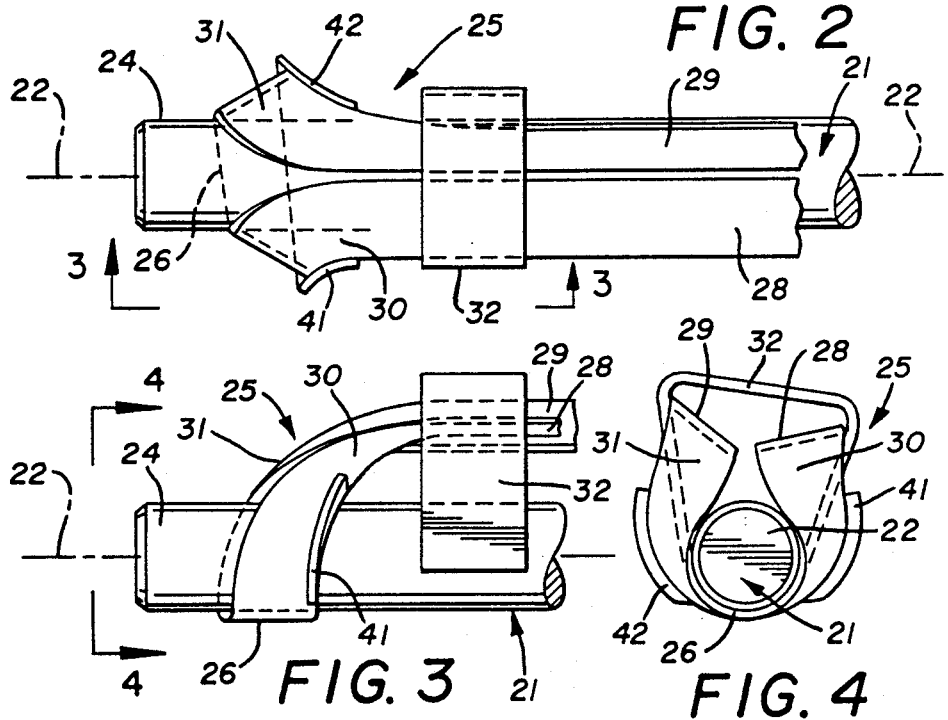
FIG. 2
FIG. 3
FIG. 4
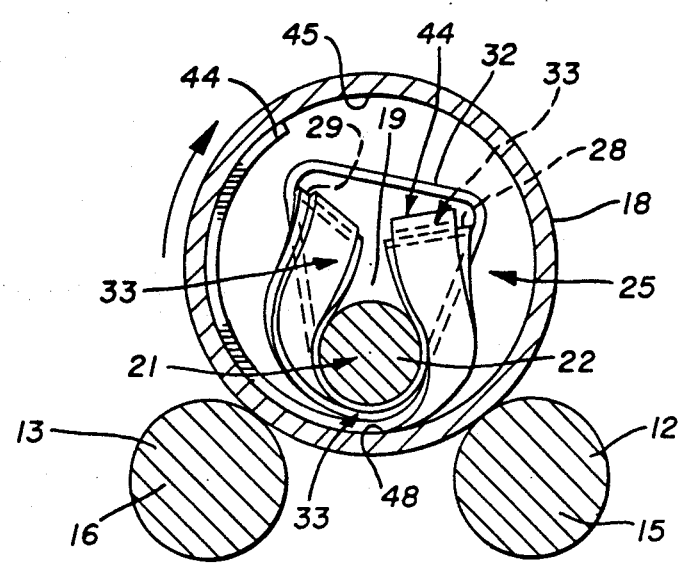
FIG. 5

METHOD AND APPARATUS FOR LINING VESSELS

TECHNICAL FIELD

The present invention relates generally to an improved method and apparatus for lining a vessel. More particularly, the present invention relates to an improved method and apparatus for applying a continuous ribbon of material to the interior surface of a vessel. Specifically, the present invention relates to an improved method and apparatus that may be employed with virtually any size vessel but which is particularly adapted for lining the cylindrical interior surface of vessels having relatively small inside diameters.

BACKGROUND OF THE INVENTION

Any number of vessels require the application of a lining to the interior surface. Such linings are utilized: to provide protection against the deleterious action of caustic, or corrosive, materials; to provide insulation; to prevent the contents of the vessel from coming into direct contact with the interior surface of the vessel; or, to preclude leakage at the juncture of any components that may be required to form the overall vessel. The application of appropriate linings to the interior of these vessels, and particularly those of relatively small diameter, has heretofore been a rather difficult task.

One prior known method has utilized the hand application of sheets of uncured, rubber stock to the interior surface of the vessel and then vulcanizing those hand applied sheets in situ. The vulcanized liner could then be machine ground to obtain the final dimensions. This approach requires splicing, hand buffing, bonding and shrinking operations, and is disadvantageous in view of the need for machining operations, the concomitant need for precision tooling and the resulting costs. Moreover, this method requires long lead times for production, which adversely affects the cost and timeliness of design changes, and it has been found that the liner does, in some instances, separate because of the need to utilize the imprecise hand application of the lining material. Accordingly, the process is labor intensive resulting in high unit costs and a need for a pool of relatively skilled laborers.

U.S. Pat. No. 3,303,079 discloses how to line cylindrical casings, or vessels, with an elastomer by laying calendared sheets of rubber on a mandrel. The elastomer layer is then encased in a resin and filament shell. A curing process is then conducted which produces an elastomer lined, composite vessel. This process is labor intensive and generally requires the hand application of multiple layers of rubber sheet.

U.S. Pat. No. 4,596,619 discloses an apparatus and method for lining a mandrel with an elastomer layer which is covered by a resin and filament coat. The composite body is cured and removed from the mandrel to provide composite shell which may be insertably received within a metallic, tubular vessel. The elastomer layer and the filament layer are applied to the mandrel separately by an applicator roller system which brings the material into contact with the surface to be coated. The coating material is distributed along the surface by moving the applicator roller system relative to the mandrel. This method and apparatus requires synchronization of the linear and circumferential speeds of the applicator relative to the surface of the mandrel. This requires a precise control mechanism and sophisticated electronic circuitry, which is particularly evident when one realizes that the mandrel must be driven by one power source, or drive system, and the applicator roller must be driven by another. Moreover, such apparatus does not permit the lining material to be applied directly to the interior surface of the vessel.

Another prior art system which will permit the lining material to be applied directly to the interior surface of a hollow vessel is the Model 618 Internal Stripwinding Machine originally developed by AMF Corporation and currently available from Steelastic West, Inc. The Model 618 uses a structure very similar to the application roller apparatus disclosed in U.S. Pat. No. 4,596,619. The Model 618 provides a headstock, a boom and a tailstock which supports one end of the boom. The other end of the boom is supported by the headstock. A carriage, carrying the applicator, is movably mounted on the boom. The boom is extended from the headstock into the vessel and then connected with the tailstock. A ribbon of the material to be deposited on the vessel interior is delivered along the boom to the applicator from which it is applied to the vessel. The vessel is rotated by one prime mover and the applicator is moved by another prime mover. The speed of the prime movers must be synchronized, the control system for the synchronization is intricate and expensive to manufacture. The use of at least two prime movers increases the cost of the machine.

While the last two described systems reduce the manual labor, they require considerable investment in capital equipment along with the technical personnel required to operate and repair the intricate electronic and electric systems. It should be appreciated that the aforesaid prior art mechanisms are particularly adapted to the application of a liner to a tubular vessel having a significantly larger inside diameter. The prior art mechanism are, however, totally inapposite for use with tubular vessels of relatively small inside diameters.

SUMMARY OF THE INVENTION

It is, therefore, a primary object of the present invention to provide an improved process and apparatus for applying a lining material to the interior surface of a vessel.

It is another object of the present invention to provide an improved method and apparatus, as above, which is suited for vessels having a relatively large inside diameter but which as particularly suited for use with vessels having a relatively small inside diameter.

It is a further object of the present invention to provide an improved method and apparatus, as above, for applying a lining material to the interior surface of a hollow, preferably cylindrical, vessel by delivering and applying the lining material with the same surface that causes the vessel to rotate about its longitudinal axis while the material is deposited on the interior surface of the vessel.

It is yet another object of the present invention to provide an improved method and apparatus, as above, for applying a lining material to an interior surface of a preferably cylindrical vessel which is supported for rotation, the lining material being received on a conveyor belt that is in driving contact with the interior surface of the vessel to effect rotation thereof while simultaneously depositing the lining material against the interior surface of the vessel at the location where the driving contact occurs.

It is an even further object of the present invention to provide an improved method and apparatus, as above, for depositing a lining material on the cylindrical interior surface of a vessel by virtue of a conveyor belt which is trained by a guide assembly carried on a boom member, the guide assembly inducing a twist to the belt which brings the belt into driving contact with the interior surface of the vessel at the location where the belt, which also transports the lining material into the vessel, deposits the lining material onto the interior surface of the vessel.

These and other objects and advantages of the present invention will be more apparent from the following drawings and description which set forth an exemplary embodiment of the invention.

A vessel is supported to be rotated about an axis which extends longitudinally of the vessel. A boom is supported in cantilevered fashion at one end, and a guide assembly is supported from the unsupported end of the boom. A drive means is positioned in general proximity to the supported end of the boom, and a conveyor belt extends from the drive means substantially parallel to the boom to engage the guide assembly. The guide assembly serves not only to change the track of the conveyor belt but also to cause the conveyor belt to twist. The twisting of the conveyor belt causes the normally inner surface thereof temporarily to become the exterior surface and thereby assume a disposition parallel to the interior surface of the vessel. When the conveyor belt has been so twisted, the normally inner surface thereof is forced into frictional driving engagement with the interior surface of the vessel. The normal movement of the conveyor belt (sometimes hereinafter designated as "linear" movement) imparted by the drive means effects rotation of the vessel by virtue of the frictional engagement between the belt and the interior surface of the vessel.

A ribbon of the lining material, which is to be applied onto the interior surface of the vessel, is conveyed by the belt from a source to the interior surface of the vessel. The belt twists relative the boom and brings the ribbon into contact with the interior surface of the vessel. The tape adheres to the interior surface and forms a lining on the interior surface of the vessel. Because there is no rotational surface speed differential between the belt and the interior surface of the vessel, the tape will be smoothly applied.

As the ribbon is applied to the interior surface of the vessel, the vessel is also moved longitudinally relative to the boom so that the entire longitudinal extent of the interior surface can be lined. The thickness of the lining may be controlled by regulating the speed at which the vessel translates longitudinally relative to the speed at which he belt is applying the lining. In effect, the aforesaid speed differential controls the pitch at which the lining material is helically applied to the interior surface of the vessel. As such, the speed differential can be employed to control not only the thickness at which the lining is applied but may also vary the thickness of the lining material at preselected locations along the longitudinal axis of the vessel.

By virtue of the frictional drive between the belt and the interior surface of the vessel, synchronous speed is achieved without the use of intricate controls. This provides for a more consistent layering of the material and a much simpler system for varying the thickness of the lining when desired.

It should be appreciated that the longitudinal axis of the belt may be angled slightly relative to the interior surface of the vessel. This slight angular inclination, or canting, will cause the vessel to translated longitudinally. The longitudinal translational of the vessel can be effected by at least two other methods. For example, the axis of the boom can be angled relative to the axis about which the vessel is rotated, or the vessel can be translated longitudinally by means which are independent of the means by which the lining material is applied. That is, the vessel may be longitudinally translated by a separate power source.

The ribbon itself generally consists of at least one layer of the desired lining material. The lining material can be acquired with an adhesive applied to one surface of the ribbon, or, as another example, the ribbon may be extruded from a conventional extruding machine directly onto the conveyor belt at a location outside the vessel. The extruding process can be used to control the width and/or thickness of the ribbon as it is delivered to the belt. This is another easily controlled variable which increases the overall adaptability of the process.

In practicing the present invention the following process may be utilized:

1. The vessel to be lined may be mounted for rotation about an axis;
2. A boom, guide assembly and an endless conveyor belt are inserted into the vessel to be lined;
3. A portion of the conveyor belt is pressed into driving engagement with the interior surface of the vessel to which the lining material is to be applied;
4. A ribbon of lining material is deposited onto a supporting surface of the endless conveyor belt;
5. The belt is driven;
6. The vessel is rotated by engagement thereof with the conveyor belt;
7. The ribbon of lining material is transported on the belt to the interior surface of the vessel; and,
8. The ribbon of lining material is transferred from the belt onto the interior surface of the vessel.

During the aforesaid process the relative longitudinal translation of the vessel in relation to the linear speed of the belt can be controlled to adjust the thickness of the lining.

The present method is described in conjunction with one exemplary embodiment of an apparatus which is deemed sufficient to effect a full disclosure of the subject invention. The exemplary apparatus is described in detail without attempting to show all of the various forms and modifications in which the invention might be embodied; the invention being measured by the appended claims and not by the details of the specification.

BRIEF DESCRIPTION OF THE DRAWINGS

FIG. 2 is a top plan view of the outboard end of the support boom utilized on the apparatus depicted in FIG. 1 and detailing the guide assembly positioned thereon;

FIG. 3 is a side elevation taken substantially along line 3—3 of FIG. 2;

FIG. 4 is an end elevation taken substantially along line 4—4 of FIG. 3;

FIG. 5 is a view similar to FIG. 4, but depicting the interrelationship of the boom, guide assembly and a cylindrical vessel as the apparatus is applying a lining to the interior surface of that vessel; and, FIG. 6 is a side elevation, partly broken away, of vessel that has been lined according to the concepts of the method to which the present invention is directed, and on an apparatus that also embodies the concepts thereof.

DESCRIPTION OF AN EXEMPLARY EMBODIMENT

Figure 1:
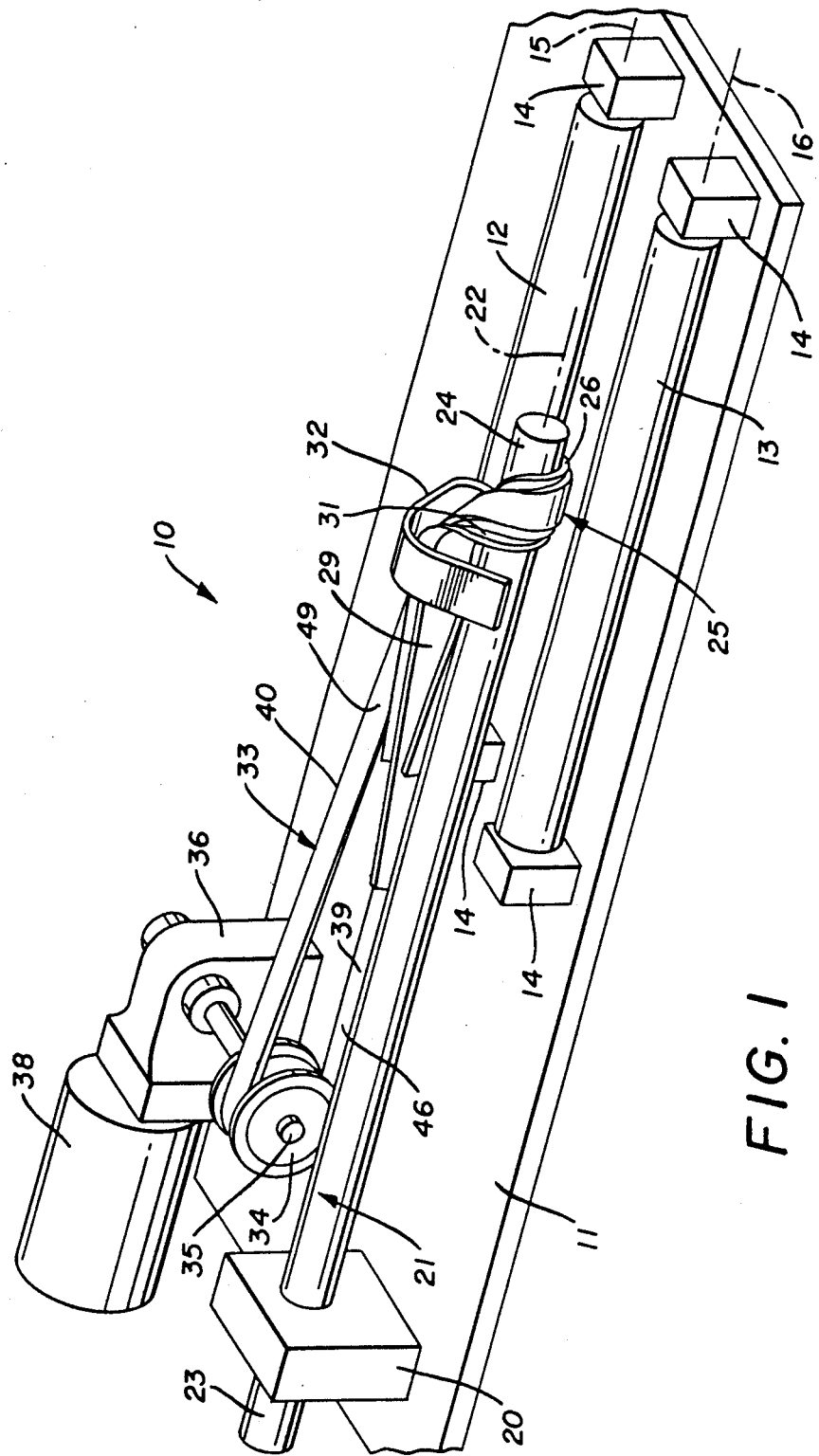
FIG. 1 is a perspective view of an exemplary apparatus which embodies the concepts of the present invention and which is readily adapted for applying a lining to the interior surface of a vessel.

Referring to the drawings, wherein the same characters represent the same or corresponding parts throughout the several views, an apparatus for lining the interior surface of a vessel is indicated generally by the numeral 10. As represented in FIG. 1, the apparatus 10 is supported from a platform 11. A first and second roller, 12 and 13, respectively, are also supported from the platform 11 to be freely rotatable thereon. Specifically, the rollers 12 and 13 are each supported on a pair of longitudinally spaced pillow blocks 14. Each roller 12 and 13 has a respective longitudinal axis 15 and 16, respectively, and a vessel 18, such as a cylindrical tube or pipe, as depicted in FIG. 5, rests on the rollers 12 and 13 with the longitudinal axis 19 of the vessel 18 being preferably parallel with the longitudinal axes 15 and 16 of the respective first and second rollers 12 and 13.

The platform 11 also supports a headstock 20. A substantially cylindrical boom 21—having a longitudinal axis 22 which is substantially parallel with the axes 15, 16 and 19—is secured to the headstock 20 in cantilevered fashion near one end portion 23 so the other end portion 24 of the boom 21 may remain unsupported. A guide assembly 25 is secured to the boom 21 near the unsupported end 24 thereof. The guide assembly 25 has a substantially circular loop portion 26 and a pair of bed portions 28 and 29. The loop portion 26 encircles, and is thus disposed circumjacent, the unsupported end 24 of the boom 21. The bed portions 28 and 29 merge with, and extend outwardly from, the respective transitional portions 30 and 31 which are interposed between the opposite ends of the loop portion 26 and the respective bed portions 28 and 29. As such, the bed portions 28 and 29 extend toward the headstock 20 in substantially parallel disposition relative to the axis 22 of the boom 21.

A bridge 32, which is anchored to the boom 21, is secured to the bed portions 28 and 29 to provide lateral support thereto. An endless conveyor belt 33 slidably engages the bed portions 28 and 29 and is trained about the loop portion 26 of the guide assembly 25. The conveyor belt 33 drivingly engages a pulley 34 which is presented on the output shaft 35 of a conventional gear reduction unit 36, that may be driven by an electrical motor 38. As best seen in FIGS. 1, 2 and 3, the conveyor belt 33 has two spans 39 and 40 which extend from the pulley 34 to the respective bed portions 28 and 29. The first span 39 travels away from the pulley 34 when the pulley 34 is rotated by the motor 38 and gear reduction unit 36 while the second span 40 travels toward the pulley 34.

A side flange 41 assists in retaining the conveyor belt 33 in the desired path as it negotiates the transitional portion 30 between the bed portion 28 and the loop portion 26. A side flanges 42 similarly assists in retaining the belt 33 in the desired path as it negotiates the transitional portion 31 between the loop portion 26 and the bed portion 29. While it has been found that these flanges 41 and 42 are not absolutely essential in practicing the concepts of the present invention, they do preclude that lateral movement of the belt 33 which might effect inadvertent disengagement thereof relative to the loop portion 26 when substantial forces are encountered between the conveyor belt 33 and the vessel 18.

Figure 6:
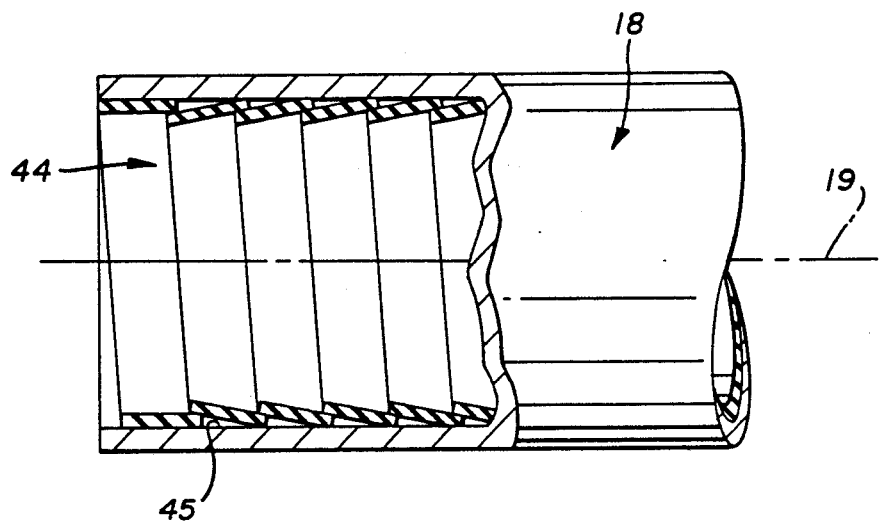

The ribbon 44 (FIGS. 5 and 6) of lining material which is to be applied onto the interior surface 45 of the vessel 18 is deposited onto the supporting surface 46 of the span 39 a short distance after the conveyor belt 33 leaves the pulley 34. The ribbon 44 of lining material is carried by the belt 33 around approximately one-half of the loop portion 26 to the point 48 at which the ribbon 44 is in full contact with the interior surface 45 of the vessel 18 and the belt 33 is applying the maximum pressure against the ribbon 44 and the interior surface 45 of the vessel 18. This contact pressure assures that the ribbon 44 of lining material will transfer from the supporting surface 46 of the conveyor belt 33 onto the interior surface 45 of the vessel 18. The contact force required to effect the transfer is determined, at least in part, by the material to be deposited. As a result of the contact pressure, the supporting surface 46 on the conveyor belt 33 will conform to the interior surface 45 of the vessel 18 at the of contact point 48. The amount of belt area that conforms to the interior surface 45 of the vessel 18 will depend, in part, on the contact force and the stiffness of the belt 33.

The flanges 41 and 42 are preferably discontinued along that arc of the loop portion 26 where the belt 33 contacts the interior surface 45 of the vessel 18. In the alternative, the height of the flanges 41 and 42 can be restricted to a dimension that is no greater than the thickness of the ribbon 44. The objective is to prevent the flanges 41 and 42 from interfering with the contact between the ribbon 44 carried on the conveyor belt 33 and the interior surface 45 of the vessel 18.

Close inspection of the drawings will reveal that the conveyor belt 33 has a supporting surface 46 which is disposed along the inner face of the belt 33 as it engages the drive pulley 34 and a sliding surface 49 which is disposed along the outer face of the belt 33 as it engages the drive pulley 34. The ribbon 44 of lining material is deposited on the supporting surface 46 which faces upwardly along the span 39 of the belt 33. The ribbon 44 is transported with the belt 33 as the belt 33 moves in response to rotation of the drive pulley 34. As such, when the belt 33 enters the guide assembly 25 it moves along the bed portion 28 until it reaches the transitional portion 30. At that point the belt 33 begins to turn and twist. Turning the belt 33 changes its track so that it will extend radially with respect to the vessel 18 rather that longitudinally. At the same time the belt 33 is twisted so that the supporting surface 46 will become the outermost surface of the belt 33 as the belt 33 encircles the boom 21. By the same token, the surface 49 slides along the transitional portion 30 onto the loop portion 26. Thus, the guide assembly 25 essentially twists the belt 33 one hundred and eighty degrees (180°) as it approaches the interior surface 45 of the vessel 18 so the belt 33 can force the ribbon 44 into forceful abutment with the interior surface 45 of the vessel 18. This action transfers the ribbon 44 of the lining material onto the interior surface 45 of the vessel 18. Thereafter, the guide assembly 25 twists the belt 33 back to its original orientation so that the belt 33 is presented to the pulley 34 in the proper attitude—i.e.: in the same attitude that it left the pulley 34 when it was moving toward the guide assembly 25.

At the point of contact 48, the loop portion 26, and therefor the belt 33, is angularly disposed relative to the longitudinal axis 19 of the vessel 18, and therefor to the interior surface 45 of the vessel 18. This angularity of the belt 33 effects longitudinal translation of the vessel 18 along the axes 15 and 16 of the rollers 12 and 13 in addition to imparting rotary motion to the vessel 18. As a result, the ribbon 44 may be applied along the entire longitudinal extent of the interior surface 45. The helical pitch at which the ribbon 44 is applied is determined by the angular relation of the belt 33 relative to the interior surface 45. This, of course, determines the thickness of the lining applied to the interior surface 45 of the vessel 18.

The ribbon 44 of lining material can be deposited on the supporting surface 46 of the conveyor belt 33 by any of the well known methods of placing material on a moving surface. The boom 21, the guide assembly 25 and belt 33 can be made in a wide variety of sizes, including sizes small enough to accommodate small diameter pipes, or tubes, as well as large diameter structures. The lining material can be of substantially any composition which is compatible with transportation on a belt. Such materials include but are not limited to uncured rubber, polyfluorocarbons or fibrous materials.

The foregoing description of the exemplary embodiment of the invention has been presented for the purposes of illustration and description. It is not intended to be exhaustive or to limit the invention to the precise form disclosed. Obvious modifications, or variations, are possible in light of the above teachings. The embodiment was chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A method for lining the interior surface of a vessel with a ribbon of lining material comprising:
   mounting the vessel for rotation about an axis;
   extending a boom, guide assembly and an endless conveyor belt into the vessel;
   pressing a portion of the conveyor belt into driving engagement with the interior surface of the vessel upon which the lining material is to be applied;
   depositing the ribbon of lining material onto a surface of the endless conveyor belt;
   driving the belt;
   rotating the vessel by engagement with the belt;
   transporting the lining material on the belt to the interior surface of the vessel; and,
   transferring the lining material from the belt to the interior surface of the vessel.

2. The method, as set forth in claim 1, further comprising the steps of:
   translating the vessel substantially parallel to the axis about which the vessel is rotatably mounted.

3. The method, as set forth in claim 1, further comprising the steps of:
   aligning the belt substantially parallel to the axis about which the vessel is rotatably mounted;
   turning and twisting the belt so that it extends substantially radially of the axis about which the vessel is rotatably mounted to engage the interior surface of the vessel and thereby impart translation of the vessel substantially parallel to the axis about which the vessel is rotatably mounted.

4. The method, as set forth in claim 2, further comprising the step of:
   extruding the ribbon directly onto the conveyor belt.

5. The method, as set forth in claim 2, further comprising the step of:
   effecting a slightly oblique angular engagement between the conveyor belt and the interior surface of the vessel contacted thereby in order not only to rotate the vessel but also to translate the vessel substantially parallel to the axis about which the vessel is rotatably mounted.

6. A method for lining the interior surface of a vessel surface with a continuous ribbon of lining material comprising the steps of:
   mounting the vessel for rotation about an axis;
   extending a boom, guide assembly and an endless conveyor belt into the vessel;
   pressing a portion of the conveyor belt into drive engagement with the interior surface of the vessel upon which the lining material is to be applied;
   depositing the lining material onto a surface of the conveyor belt;
   driving the conveyor belt;
   rotating the vessel by engagement of the interior surface thereof with the driven conveyor belt;
   transporting the lining material on the driven conveyor belt to the interior surface of the vessel;
   transferring the lining material from the conveyor belt to the interior surface of the vessel; and,
   translating the vessel relative to the boom, guide assembly and conveyor belt in a longitudinal direction while maintaining the drive engagement between the belt and the interior surface of the vessel in order to apply the lining material along the entire interior surface of the vessel.

7. An apparatus for dispensing a lining material onto an interior surface of a vessel comprising:
   a boom mounted in a cantilevered fashion with a supported end and an unsupported end;
   an endless conveyor belt;
   said conveyor belt having a material supporting surface;
   said conveyor belt reeved to move substantially parallel to said boom;
   a guide assembly mounted in proximity to the unsupported end of said boom;
   said guide assembly imparting a turn and a twist to the conveyor belt to establish a path substantially encircling said boom at the unsupported end thereof in order to present the material supporting surface on the conveyor belt in opposed disposition relative to the interior surface of the vessel; and,
   means for driving said conveyor belt.

8. The apparatus, as set forth in claim 7, further comprising:
   support means to receive the vessel and allow the vessel to be freely rotated about an axis that is substantially parallel with said boom.

9. The apparatus, as set forth in claim 8, further comprising:
   means to translate the vessel longitudinally along the axis about which the vessel is rotatably mounted.

10. The apparatus, as set forth in claim 8, wherein:

said guide assembly forces the material supporting surface on said conveyor belt against the interior surface of the vessel with sufficient force to apply the ribbon of lining material onto the interior surface and also to effect rotation of the vessel in response to movement of the conveyor belt.

11. The apparatus, as set forth in claim 10, wherein: said guide assembly angularly disposes said conveyor belt against the interior surface of the vessel to effect translation of the vessel along the axis about which it is rotatably mounted.

12. The apparatus, as set forth in claim 7, wherein said guide assembly further comprises:
a loop portion, and a pair of bed portions and a pair of transitional portions interposed between each bed portion and the loop portion;
said loop portion supported from, and substantially encircling, the unsupported end of said boom;
said transitional portions guiding said belt into a twist and out of a twist while encircling the unsupported end of said boom;
said bed portions extending substantially parallel to the boom for guiding said belt to and from said transitional portions.

* * * * *